United States Patent
Koga et al.

[15] 3,691,203
[45] Sept. 12, 1972

[54] FLUORAN DERIVATIVES FOR PRESSURE SENSITIVE COPYING PAPER

[72] Inventors: Koichi Koga, Toyonaka; Hideaki Suda, Takaishi; Takashi Akamatsu, Ashiya, all of Japan

[73] Assignee: Sumitomo Chemical Company, Ltd., Higashi-ku, Osaka, Japan

[22] Filed: April 7, 1970

[21] Appl. No.: 26,410

[52] U.S. Cl. ..................260/335, 117/36.2, 117/36.8
[51] Int. Cl. ..............................................C07d 05/34
[58] Field of Search ...........260/335, 343.3; 117/36.2

[56] References Cited

UNITED STATES PATENTS

| | | |
|---|---|---|
| 3,506,471 | 4/1970 | Kimura et al............117/36.2 |
| 3,514,310 | 5/1970 | Kimura et al............117/36.2 |

FOREIGN PATENTS OR APPLICATIONS

| | | |
|---|---|---|
| 6,993 | 3/1969 | Japan....................260/343.6 |

Primary Examiner—Alex Mazel
Assistant Examiner—Anne Marie T. Tighe
Attorney—Stevens, Davis, Miller & Mosher

[57] ABSTRACT

Novel 2,4-di-substituted-6-di-substituted-aminofluorans having the general formula:

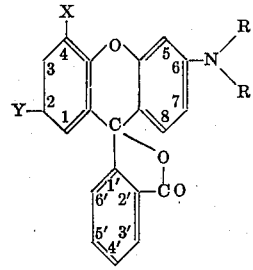

wherein X and Y represent chlorine atoms, bromine atoms or $C_{1-4}$ alkyl groups, provided the case where both X and Y are methyl groups is excluded; and R represents a hydrogen atom, a $C_{1-4}$ alkyl group, a benzyl group, a methoxymethyl group, an ethoxymethyl group, a methoxyethyl group or an ethoxyethyl group. These compounds are useful for the production of pressure-sensitive copying paper.

9 Claims, No Drawings

FLUORAN DERIVATIVES FOR PRESSURE SENSITIVE COPYING PAPER

This invention relates to novel pressure-sensitive materials, a method for preparing the same and pressure-sensitive copy paper.

More particularly, the present invention relates to novel 2,4-di-substituted-6-di-substituted-aminofluorans represented by the following formula (I), a method for preparing the same and pressure-sensitive copy paper prepared by using the same as a pressure-sensitive material

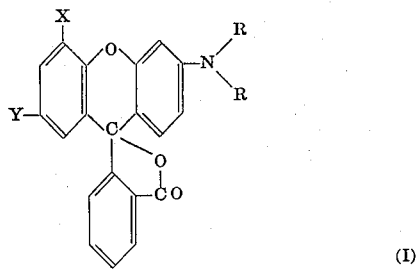

(I)

wherein X and Y represent lower alkyl groups, provided that the case where both X and Y are methyl groups is excluded, or halogen atoms; R represents hydrogen atom, a lower alkyl group, an aralkyl group, an alkoxyalkyl group or a halogenated alkyl group.

In the present invention, the term "lower alkyl" means an alkyl having one to four carbon atoms and "alkyl" in the aralkyl, alkoxyalkyl and halogenated alkyl groups means an alkyl having one or two carbon atoms, and the alkoxy means methoxy and ethoxy.

With the recent speed-up of office work, a demand for a pressure-sensitive paper is increasing in place of the oil carbon paper. It has been a drawback of the oil carbon paper that it is liable to stain clothes and wears.

The pressure-sensitive paper is usually prepared by coating a back side of one paper with an electron-doner substance of the so-called pressure-sensitive material such as leucoauramines or fluorans, and coating a surface of another paper with an acidic electron-acceptor substance, such as kaolin, bentonite, attapulgite, or tannnic acid, and is used by placing the coated papers one upon another so that the back side of the first paper may be faced to the surface of the second paper, and the back side of the second paper to the surface of the third paper and so on. By giving a pressure or impact to papers by means of a pencil, a ball-point pen or a typewriter, the material on the back side and the electron-acceptor substance on the surface of the papers are brought in contact with each other, whereby the colorless pressure-sensitive material moves the electron-acceptor layer and undergoes color-developing and therefore colored images can be obtained.

The present compounds relates to a material for such pressure-sensitive paper.

Heretofore leucoauramines, leucomethyleneblues, phthalides and fluorans are well known as pressure-sensitive materials, which are colorless or nearly colorless compounds in the initial condition, but which change to a certain color when coming into contact with the acidic electron-acceptor substances. For example 1,2-benz-6-diethylaminofluoran having the next formula (II) is one of the well known pressure-sensitive material and colorless compound having closed lactone ring in the ordinary condition, but changes to pinky red color in contact with the acidic electron-acceptor substances by l coming the lactone-ring open.

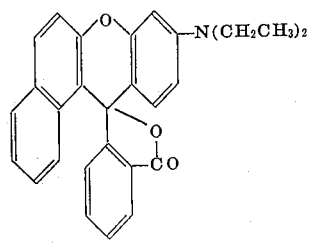

(II)

When these pressure-sensitive materials are dissolved in a non-volatile, non-polar solvent such as chlorinated benzenes, biphenyls, mineral oils, olive oil, etc., and placed in contact with the above-mentioned acidic electron-acceptor substance, the lactone ring is opened to effect an absorption in the visible range, and therefore a red color appears.

These papers consisting of one paper coated with the pressure-sensitive material and another paper coated with the acidic electron acceptor, are called pressure-sensitive copy paper or non-carbon paper.

As a result of strenuous studies and researches on the pressure-sensitive material, the present inventors have found that compounds obtained according to the present invention and represented by said general formula (I) have very excellent characteristics as a pressure-sensitive material.

The 2,4-di-substituted-6-di-substituted-aminofluoran compounds represented by the general formula (I) and obtained according to the present invention have a good solubility in a non-volatile, non-polar solvent such as chlorinated benzenes, biphenyls, toluenes and xylenes. Such good solubility makes it easy to prepare a pressure-sensitive paper, and the thus prepared pressure-sensitive paper has a low solubility in acid or alkali, and has good fastnesses to light, moisture and sublimation. Furthermore, the present pressure-sensitive paper has a high color-developing speed and after the color development it shows a clear, vivid red color characteristic of the fluoran. These red colored compounds seemed to have open lactone-ring structures, have usually three absorption peaks; two peaks in a range of 450 –570 mµ, corresponding to red color, and also another broad peak in a range of 370 –410 mµ, which absorption is suitable for the copying machine, then the pressure-sensitive materials have such so far desirable characteristics that the copying is applicable easily. The deep vivid images can be got, when the copying machine is applied to the images which are obtained from the thus prepared pressure-sensitive copying paper using the present novel compounds.

The present compound represented by the formula (I) may be prepared by reacting 2,4-di-substituted phenol represented by the formula (IIIa),

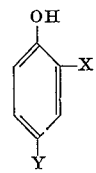

(IIIa)

wherein X and Y are as defined above, with o-(2-hydroxy-4-di-substituted-aminobenzoyl)benzoic acid represented by the formula (IVa),

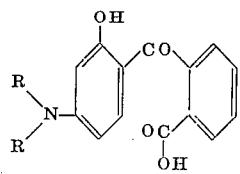

(IVa)

wherein R is as defined above, or reacting m-di-substituted-aminophenol represented by the formula (IIIb),

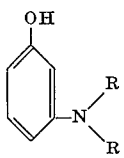

wherein R is as defined above, with o-(2 hydroxy-3,5-di-substituted-benzoyl)benzoic acid represented by the formula (IVb),

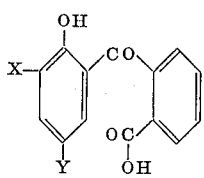

(IVb)

wherein X and Y are as defined above, to obtain 9-(o-carboxyphenyl)-2,4-di-substituted-6-di-substituted-aminoxanthohydrol represented by the formula (V),

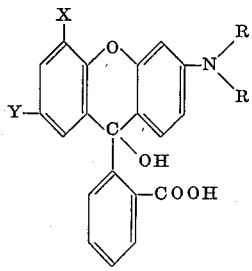

(V)

wherein X, Y and R are as defined above, and heat-treating the resulting aminoxanthohydrol represented by the formula (V) to ring-close.

More concretely for the production of the novel compound represented by the formula (I), the reaction between the substituted phenol of the formula (IIIa) or the aminophenol of the formula (IIIb) and benzoic acid of the formula (IVa) or (IVb) may be effected at a temperature of 50°–300°C. for several hours in the absence or presence of a dehydrating-condensing agent.

After the reaction is over, the reaction mixture is poured into ice or water to separate solids, and if desired the mixture is neutralized with an alkali such as caustic soda, potassium hydroxide and the like, thereby to obtain the aminoxanthohydrol of the formula (V).

The dehydrating-condensing agent includes sulfuric acid, phosphorus pentaoxide, phosphoric acid, tin chloride, zinc chloride and aluminum chloride.

In order to convert the aminoxanthohydrol represented by the general formula (V) to the compound represented by the general formula (I) by closing the ring, the compound (V) may be heated at 80°–150bLC. in a solvent, and then the mixture may be cooled to obtain the compound of the formula (I) as white crystals.

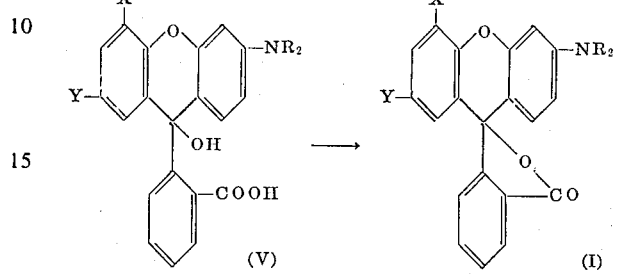

In the above formulas, X, Y and R are as defined above.

The solvent includes aromatic solvents such as benzene, xylene and chlorobenzene, alcohols such as methanol and ethanol, and dimethylformamide.

The ring-closing can be readily carried out by adding an aliphatic amine such as triethylamine, aliphatic aminoalcohol such as ethanol amine, or a basic heterocylic substance such as pyridine thereto.

It is preferably to wash the white crystals separated by filtration with a sparingly soluble, non-polar solvent such as cyclohexane, hexane, etc..

Said compounds (I) have a very short color-developing time when the compounds are brought into contact with an acidic electron-acceptor substance by an impact by means of a pencil, etc., and also have a good solubility in the non-polar solvent to make the preparation of the pressure-sensitive paper easy. Further, the compounds (I) have a very good fastnesses to light, moisture and sublimation.

In the preparation of a pressure-sensitive copy paper with use of the compound (I), it is possible to use two or more kinds of said compounds (I) at the same time, or to use said compounds (I) together with other pressure-sensitive materials to obtain a special color such as black, without spoiling said other materials. This is a significant feature of the present invention.

A pressure-sensitive paper may be prepared by using the present compound (I) according to the conventional procedure. For example, the present 2,4-di-substituted-6-di-substituted-aminofluoran derivative (I) is dissolved in a non-volatile, non-polar solvent such as tricresyl phosphate, chlorinated biphenyl, mineral oil, paraffin oil, olive oil, etc. and the resulting solution is added to an aqueous colloidal solution containing gelatine, gum arabic, casein, etc. with vigorous stirring, to disperse the compound (I) in the mixture as fine particles having a size of about 3 to about 5$\mu$. After adjusting the pH to 3.0 to 5.0, the obtained sol is hardened with formalin, glutaric aldehyde and the like. A paper is coated with the resulting emulsion and dried, whereby a pressure-sensitive paper can be obtained.

The present invention will be explained by referring to the following examples, which are, of course, not to limit the scope of the present invention.

EXAMPLE 1

430 g of 65 percent sulfuric acid was placed in a four-necked flask provided with a stirrer, a thermometer and a cooler and 16.5 g of 2-chloro-4-methylphenol and 32.2 g. of O-(2-hydroxy-4-diethylaminobenzoyl)benzoic acid were added thereto.

The mixture was heated at 125°–130°C. for 5 hours.

After cooling, the reaction product at 5°C. was poured into 1,000 g of ice and neutralized with 768 g of an aqueous 35 percent caustic soda solution at 38°C. to make pH 7.6. The precipitates were separated by filtration and washed with cold water, whereby 44 g of red 9-(o-carboxylphenyl)-2-methyl-4-chloro-6-diethylaminoxanthohydrol was obtained.

The resulting compound was heated together with 100 cc. of triethylamine and 400 cc. of benzene, and then the reaction mixture was subjected to filtration to obtain 23 g of 2-methyl-4-chloro-6-diethylaminofluoran as white crystals. In a formic acid solvent, the lactone ring was opened and thus the resulting compound had light absorptions at 405, 500 and 535 $\mu$.

When used as a material for pressure-sensitive copy paper, the resulting compound served a red color-developing dye, which was excellent in color-developability, copying ability and fastnesses to light, moisture, sublimation and alkali.

EXAMPLE 2

82 g of 2-methyl-4-tert.-butylphenol and 162 g of o-(2-hydroxy-4-diethylaminobenzoyl)benzoic acid were added to 1,700 g of 66 percent sulfuric acid in the same manner as in Example 1, and the mixture was subjected to reaction at 132° to 135°C. for 6 hours. Then, the reaction mixture was poured into 1,500 g of ice, and the mixture was neutralized with 3,000 g of an aqueous 35 percent caustic soda solution to make pH 6.8, and subjected to filtration to separate crystals, which were washed with water, thereby to obtain 227 g of 9-(o-carboxyphenyl)-2-tert.-butyl-4-methyl-6diethylaminoxanthohydrol.

26 g of the thus obtained crystals was heated together with 50 cc. of triethylamine and 100 cc. of methanol, and then the reaction mixture was subjected to filtration to obtain 7 g of 2-tert.-butyl-4-methyl-6-diethylaminofluoran as white crystals.

The resulting white compound had a melting point of 237°–239°C., and had light absorptions at 406, 500 and 532 m$\mu$ through the opening of the lactone ring, when placed in a formic acid solvent.

EXAMPLE 3

8 g of 2-methyl-4-chlorophenol and 16.2 g of o-(2-hydroxy-4-diethylaminobenzoyl)benzoic acid were heated at 135°–140°C. in 280 g of 62 percent sulfuric acid for 6 hours in the same manner as in Example 1. After the reaction was over, the reaction mixture was poured into 1,500 g of ice, and neutralized with 815 cc. of an aqueous 22 percent caustic soda solution to make pH 7.6, whereby 14 g of 9-(o-carboxyphenyl)-2-chloro-4-methyl-6-diethylaminoxanthohydrol was obtained.

The thus obtained compound was heated together with 50 cc. of triethylamine, 100 cc. of alcohol and 60 cc. of toluene, whereby 7 g of colorless crystals of 2-chloro-4-methyl-6-diethylaminofluoran was obtained.

The resulting compound had a melting point of 220°–222°C. and had light absorptions at 379, 396, 503 and 536 m$\mu$ through the opening of the lactone ring, when placed in a formic acid solvent.

EXAMPLE 4

By using o-(2-hydroxy-4-dimethylaminobenzoyl)-benzoic acid, o-(2-hydroxy-4-dimethoxyethylaminobenzoyl)-benzoic acid, o-(2-hydroxy-4-dibenzylaminobenzoyl)benzoic acid or o-(2-hydroxy-4-bis-$\beta$-chloroethylaminobenzoyl)benzoic acid in place of o-(2-hydroxy-4-diethylaminobenzoyl)benzoic acid in Example 1, a red material for pressure-sensitive paper having properties similar to those of the crystals of Example 1 was obtained as colorless crystals respectively.

EXAMPLE 5

430 g of 65 percent sulfuric acid was placed in a four-necked flask provided with a stirrer, a thermometer and a cooler and 49 g of 2-tert.-butyl-4-methylphenol and 97 g of o-(2-hydroxy-4-diethylaminobenzoyl)benzoic acid were added thereto. The mixture was heated at 120°–130°C. for 6 hours with stirring.

After cooling, the resulting reaction mixture was poured into ice and neutralized with 300 g of an aqueous caustic soda solution at room temperature. The precipitates were separated by filtration and washed with cold water, whereby 140 g of 9-(o-carboxylphenyl)-2-methyl-4-tert.-butyl-6-diethylaminoxanthohydrol was obtained.

20 g of the resulting compound was heated together with 100 cc. of triethylamine and 50 cc. of alcohol, and thereafter the mixture was subjected to filtration to obtain 12 g of white crystals of 2-methyl-4-tert.-butyl-6-diethyl-aminofluoran.

The resulting compound had a melting point of 153°–154°C. and had absorptions at 378, 395, 498 and 533 m$\mu$ in the visual region through the opening of the lactone ring, when placed in a formic acid solvent.

The resulting compound had a very high color-developing rate and gave a clear deep red color, when used as a pressure-sensitive material. The developed color had a good light fastness and was copyable by a copying machine.

EXAMPLE 6

By using o-(2-hydroxy-4-dimethylaminobenzoyl)-benzoic acid, o-[2-hydroxy-4-bis(2-chloroethyl)-aminobenzoyl]benzoic acid, o-[2-hydroxy-4-bis(2-methoxyethyl)-aminobenzoyl]benzoic acid, or o-(2-hydroxy-4-dibenzylaminobenzoyl)benzoic acid in place of o-(2-hydroxy-4-diethylaminobenzoyl)benzoic acid of Example 5, a pressure-sensitive material having similar properties was obtained as colorless crystals respectively.

EXAMPLE 7

68.7 g of 2-bromo-4-tert.-butylphenol and 96.6 g of o-(2-hydroxy-4-diethylaminobenzoyl)benzoic acid were heated at 120°–125°C. in 432 g of 65 percent sulfuric acid for 7 hours.

After cooling, the reaction mixture was poured into 1,500 g of ice and neutralized with caustic soda to make pH 7.2, whereby semi-solid state 9-(o-carboxyphenyl)-2-tert.-butyl-4-bromo-6-diethylaminoxanthohydrol was obtained.

The resulting product was stirred together with 50 cc. of methanol, and subjected to filtration to separate crystals, which were then heated together with 500 cc. of triethylamine in 250 cc. of alcohol. 80 g of white solids of 2-tert.-butyl-4-bromo-6-diethylaminofluoran was obtained.

The resulting compound had a high color-developing rate and gave a clear red color having a good fastness to light, when used as a pressure-sensitive material. The developed color was copyable by a copying machine and the compound had also a good fastness to moisture.

EXAMPLE 8

By using 2-tert.-butyl-4-bromophenol, 2-ethyl-4-bromophenol, 2-ethyl-p-cresol or 2-propyl-4-bromophenol, in place of 2-bromo-4-tert.-butylphenol of Example 7, a pressure-sensitive material having similar red color of good fastness to light was obtained respectively.

EXAMPLE 9

According to the method similar to that of Example 1 from 450 g of 65 percent sulfuric acid, 19.8 g of m-dimethylaminophenol and 28.4 g of o-(2-hydroxy-3-methyl-5-ethyl benzoyl)benzoic acid, a pressure-sensitive material, 2-ethyl-4-methyl-6-dimethylaminofluoran, having similar properties was obtained as colorless crystals.

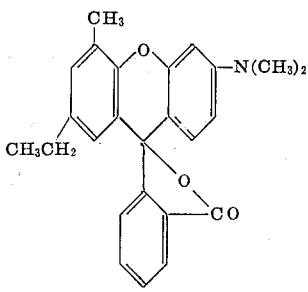

EXAMPLE 10

5 g of 2-tert.-butyl-4-methyl-6-diethylaminofluoran was dissolved in 140 g of dichlorodiphenyl, and the resulting solution was added to 60 g of 11 percent aqueous gelatine solution and the mixture was stirred vigorously to make a dispersion of oil droplets having sizes of 3 to 5 $\mu$. After adjusting the pH to 4.0 to 4.3, the obtained sol was hardened with formalin. Then, a paper was coated with the thus prepared emulsion and dried. The amount of coating was 8 g/m². The thus coated paper was placed on another paper coated with activated clay, kaolin or the like so that the coated layers were faced to each other. By applying a pressure to the paper, a clear red image was obtained. The pressure-sensitive paper had a very high color-developing rate and had a good fastness to light.

The color-developed, pressure-sensitive paper was copyable by a copying machine.

EXAMPLE 11

By using 2-methyl-4-tert.-butyl-6-dimethylaminofluoran, 2-methyl-4-bromo-6-dimethylaminofluoran, 2-bromo-4-tert.-butyl-6-diethylaminofluoran or 2-tert.-butyl-4-methyl-6-bis-chloromethylaminofluoran in place of 2-tert.-butyl-4-methyl-6-diethylaminofluoran of Example 10, a pressure-sensitive paper having a high color-developing rate and a good fastness to light, similar to those of Example 10, was prepared respectively.

EXAMPLE 12

1 g of 2-methyl-4-tert.-butyl-6-diethylaminofluoran and 8 g of N-diisobutylleucoauramine were dissolved in 140 g of trichlorodiphenyl in the same manner as in Example 10.

The resulting solution was added to 60 g of 10 percent aqueous gelatine solution and the mixture was stirred vigorously to make a dispersion of oil droplets having sizes of 3 to 5$\mu$. After adjusting the pH to 4.0 to 4.3, the obtained sol was hardened with formalin. A paper was coated with the resulting emulsion and dried. The amount of coating was 8 g/m². The thus coated paper was placed on another paper coated with kaolin or the like so that coated layers were faced to each other. By applying a pressure to the paper by a pencil, a clean red color was obtained which was gradually changed to black. The color-developed, pressure-sensitive paper was copyable and had a good fastness to moisture.

EXAMPLE 13

By using 2-methyl-4-tert.-butyl-6-dimethylaminofluoran, 2-tert.-butyl-4-methyl-6-dimethylaminofluoran, 2-tert.-butyl-4-methyl-6-diethylaminofluoran, 2-bromo-4-methyl-6-dichloromethylaminofluoran, or 2-bromo-4-tert.-butyl-6-bis-chloromethylaminofluoran in place of 2-methyl-4-tert.-butyl-6-diethylaminofluoran of Example 12, similar effect was obtained respectively.

EXAMPLE 14

4 g of 2-tert.-butyl-4-methyl-6-diethylaminofluoran, 2 g of benzoylleucomethylene blue, 3 g of crystal violet lactone and 2 g of 3,6-dimethoxyfluoran were dissolved in 140 g of dichlorodiphenyl in the same manner as in Example 10, and the resulting solution was added to 60 g of 10 percent aqueous gelatine solution and the mixture was stirred vigorously to make a dispersion of oil droplets having sizes of 3 to 5$\mu$. After adjusting the pH to 4.0–4.3, the obtained sol was hardened with formalin. A paper was coated with the resulting emulsion and dried. The amount of coating was 8 g/m². The thus coated paper was placed on another paper coated with activated clay so that the coated layers were faced to each other. By applying a pressure to the paper by a typewriter or pencil to allow the layers to come in close contact with each other, a clear black image was obtained. The thus prepared pressure-sensitive paper had a high color-developing rate, a good fastness to light and a good copyability.

EXAMPLE 15

By using 2-tert.-butyl-4-methyl-6-dimethylaminofluoran, 2-methyl-4-tert.-butyl-6-diethylaminofluoran, 2-methyl-4-tert.-butyl-6-dichloromethylaminofluoran, or 2-propyl-4-methyL-6-dimethoxyethylfluoran in place of 2-tert.-butyl-4-methyl-6-diethylaminofluoran of Example 13, a pressure-sensitive paper having a good fastness to light and a good copyability was obtained respectively.

What is claimed is:

1. A 2,4-disubstituted-6-aminofluoran compound represented by the formula,

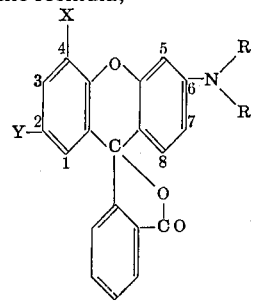

wherein X and Y represent chlorine atoms, bromine atoms or $C_{1-4}$ alkyl groups, provided the case where both X and Y are methyl groups is excluded; and R represents a hydrogen atom, a $C_{1-4}$ alkyl group, a benzyl group, a methoxymethyl group, an ethoxymethyl group, a methoxyethyl group or an ethoxyethyl group.

2. A compound represented by the formula,

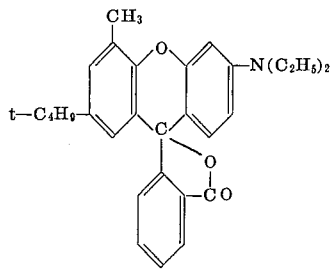

3. A compound represented by the formula,

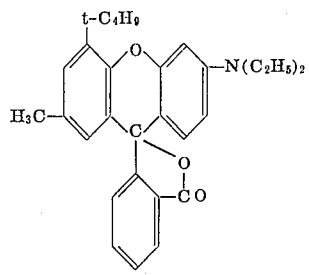

4. A compound represented by the formula,

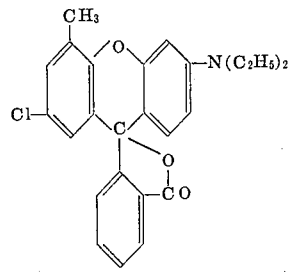

5. A compound represented by the formula,

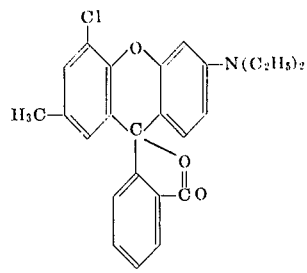

6. A compound represented by the formula,

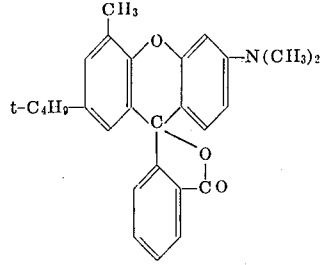

7. A compound represented by the formula,

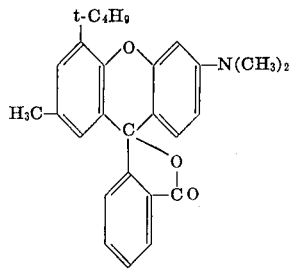

8. A compound represented by the formula,

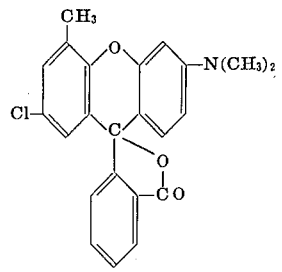

9. A compound represented by the formula,

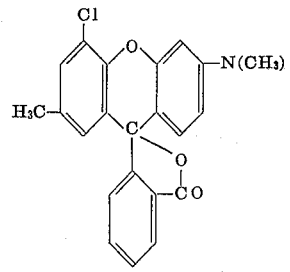

* * * * *